United States Patent [19]

Ding

[11] Patent Number: 5,022,332
[45] Date of Patent: Jun. 11, 1991

[54] COMBUSTION METHOD FOR IMPROVED ENDOTHERMIC DISSOCIATION

[75] Inventor: Maynard G. Ding, Yorktown Heights, N.Y.

[73] Assignee: Union Carbide Industrial Gases Technology Corporation, Danbury, Conn.

[21] Appl. No.: 567,786

[22] Filed: Aug. 15, 1990

[51] Int. Cl.$^5$ .............................................. F23G 7/04
[52] U.S. Cl. .................................. 110/346; 110/238; 423/522; 423/532; 423/540
[58] Field of Search ................. 110/238, 346; 423/540, 423/542, 543, 522, 532

[56] References Cited

U.S. PATENT DOCUMENTS

| 2,587,640 | 3/1952 | Miley | 23/177 |
| 2,789,035 | 4/1957 | Hurlburt | 23/177 |
| 4,212,855 | 7/1980 | Kerner et al. | 423/522 |
| 4,256,721 | 3/1981 | Blakey et al. | 423/540 |
| 4,338,870 | 7/1982 | Lanier, Jr. | 110/346 |
| 4,378,205 | 3/1983 | Anderson | 431/5 |
| 4,490,347 | 12/1984 | Gelblum | 423/521 |
| 4,541,796 | 9/1985 | Anderson | 431/187 |
| 4,853,206 | 8/1989 | Watson | 423/542 |
| 4,957,050 | 9/1990 | Ho | 110/346 |

Primary Examiner—Edward G. Favors
Attorney, Agent, or Firm—Stanley Ktorides

[57] ABSTRACT

A method for endothermically dissociating contaminated acid wherein high velocity oxidant causes a recirculation flow within a combustion zone and combusts with fuel to release heat and wherein the heat is efficiently applied by the internal recirculation to the acid for endothermic dissociation of the acid.

19 Claims, 2 Drawing Sheets

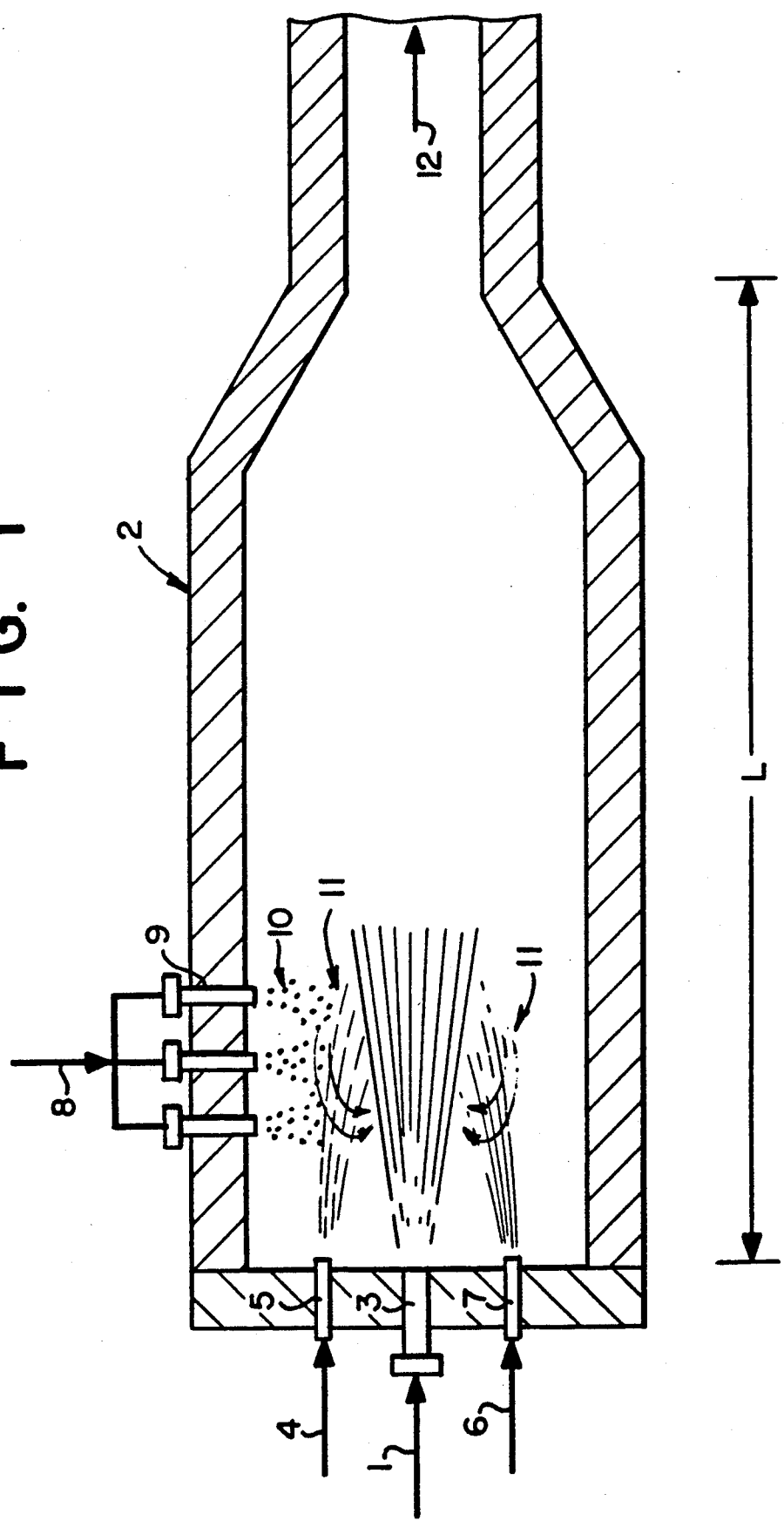

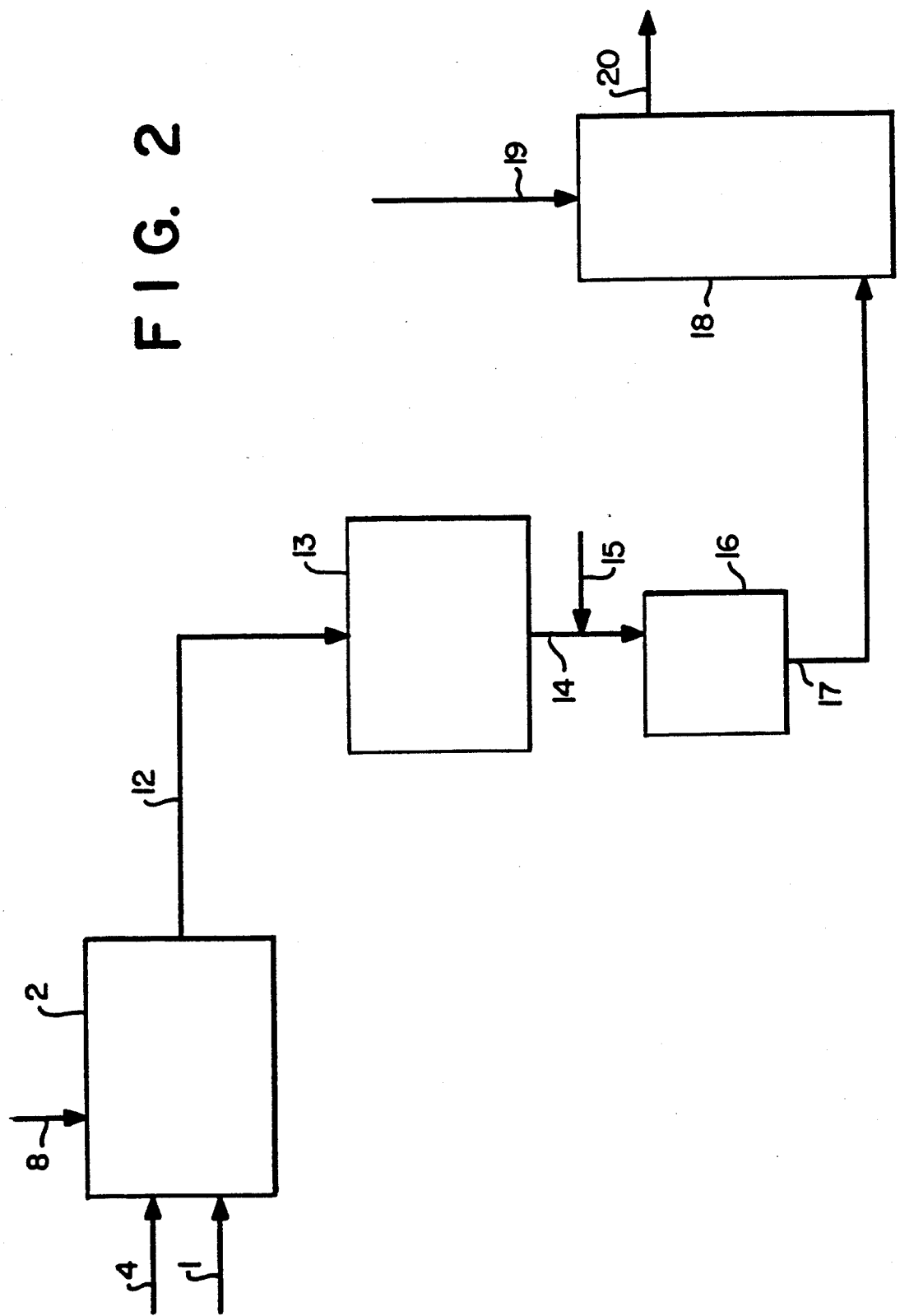

COMBUSTION METHOD FOR IMPROVED ENDOTHERMIC DISSOCIATION

TECHNICAL FIELD

This invention relates generally to endothermic dissociation by heat from combustion and more particularly to the treatment of contaminated acid by the application of heat to dissociate the acid prior to cleaning and reaction with water to produce clean acid.

BACKGROUND ART

Contaminated or spent acid may be produced in the course of a number of industrial processes such as refinery alkylation and the production of methylmethacrylates, methacrylic acid, and other monomer production processes.

The acid contaminants may include combustible species such as hydrocarbons and/or uncombustible species such as water and salt containing the sulfate ($SO_4^{-2}$).

The contaminated acid may be treated to produce fresh acid. One significant spent acid treatment process involves the use of heat to dissociate the acid, clean the dissociated products and then react them with oxygen followed by absorption of water to form fresh acid. For example, when the contaminated acid is sulfuric acid, the contaminated acid is introduced into a furnace along with fuel and air which is combusted to produce heat to vaporize the sulfuric acid and dissociate the sulfuric acid into water and sulfur dioxide. Both the vaporization and the dissociation of the sulfuric acid are endothermic. The resulting sulfur dioxide is passed, along with the other contents of the furnace, to a waste heat boiler to recover heat and then to a gas cleaning unit to produce clean sulfur dioxide. The clean sulfur dioxide is reacted with oxygen in a converter to produce sulfur trioxide and then passed through an absorption tower where the sulfur trioxide is reacted with water to produce fresh sulfuric acid.

A problem with this contaminated acid treatment system is that the processing rate of the furnace is less than the processing rate of the gas cleaning and the converter units. Moreover the heat generated within the furnace may not effectively vaporize and dissociate sufficient sulfuric acid to produce an adequate concentration of sulfur dioxide for effective downstream treatment. In this situation additional sulfur must be combusted in order to produce additional sulfur dioxide. This contributes substantially to the cost of the spent acid treatment.

The use of oxygen or oxygen-enriched air has been proposed for use in place of air as the oxidant in spent acid treatment systems since this would reduce the amount of inert nitrogen which could pass through the system and thus increase the overall processing rate of the furnace. However, such a simple substitution cannot be made because the oxygen or oxygen-enriched air and fuel will burn with a significantly increased peak flame temperature over that produced with air-fired combustion. These high peak flame temperatures lead to uneven heat distribution and hot spots within the furnace and furthermore kinetically favor the production of nitrogen oxides ($NO_x$) which not only leads to environmental problems but also, in the case of sulfuric acid treatment, will cause contamination of final sulfuric acid product thus reducing its value.

Accordingly it is an object of this invention to provide a contaminated acid treatment method wherein oxygen or oxygen-enriched air may be effectively employed as the oxidant in a combustion reaction to provide heat for the endothermic dissociation of the contaminated acid.

SUMMARY OF THE INVENTION

The above and other objects which will become apparent to one skilled in the art upon a reading of this disclosure are attained by:

A method for treating contaminated acid comprising:

(a) providing fuel into a combustion zone and, spaced therefrom, providing oxidant into the combustion zone, said oxidant having an oxygen concentration of at least 25 percent and a velocity sufficient to cause a recirculation flow within the combustion zone;

(b) combusting fuel and oxidant within the combustion zone to produce heat and to form combustion reaction products;

(c) providing acid to the combustion zone and applying heat from the combustion zone to the acid to endothermically dissociate the acid to produce an oxygen-containing dissociation product; and (d) recirculating combustion reaction products within the recirculation flow into the combustion reaction of the oxidant and fuel to dilute the combustion reaction and thus carry out the combustion reaction at a lower peak flame temperature, and to enhance the application of heat to the acid for the endothermic dissociation.

As used herein the term "dissociation" means the breaking up of a compound into two or more compounds accompanied by an adsorption of heat.

As used herein the term "peak flame temperature" means the theoretical highest temperature of all products of combustion of a fuel with an oxidant, including excess oxidant, assuming a plug flow reaction with no heat loss.

BRIEF DESCRIPTION OF THE DRAWINGS

FIG. 1 is a cross-sectional representation of one embodiment of the invention.

FIG. 2 is a simplified schematic flow chart of a contaminated acid treatment system with downstream cleaning and regeneration.

DETAILED DESCRIPTION

The present invention may be used to treat any contaminated acid. The invention will find particular utility in the treatment of contaminated sulfuric acid. When sulfuric acid is treated the oxygen-containing dissociated product comprises sulfur dioxide.

The invention will be described in detail with reference to the drawings and in conjunction with treatment of contaminated sulfuric acid.

Referring now to FIG. 1, oxidant 1 is provided into furnace or combustion zone 2 through, for example, lance or burner 3. The oxidant has an ration of at least 25 percent and oxygen concentration preferably has an oxygen concentration of at least 30 percent. Most preferably the oxidant is higher purity oxygen having an oxygen concentration of at least 90 percent. Technically pure oxygen having an oxygen concentration of at least 99.5 percent may be effectively employed in the practice of this invention. Air may also be employed in the practice of this invention in addition to the defined oxidant to provide additional oxygen for the combustion reaction. The oxidant is injected into the combustion zone at a high velocity sufficient to cause a recirculation flow within the combustion zone. Preferably the oxidant velocity is at least 300 feet per second (fps) and most preferably is within the range of from 500 to 3000 fps.

Fuel is provided into combustion zone 2 spaced from the point where the oxidant is provided into combustion zone 2. The fuel may be liquid fuel or it may be gaseous fuel. Among the liquid fuels which may be used in the practice of this invention one can name No. 2 fuel oil, No. 6 fuel oil, and contaminated waste oil, and among the gaseous fuels which may be used in the practice of this invention one can name natural gas, propane, hydrogen sulfide, and a waste stream containing hydrocarbons. When sulfuric acid is being treated wherein the generation of sulfur dioxide is desired, sulfur or an oxidizable sulfur containing compound may conveniently be present in the liquid fuel and an oxidizable sulfur containing compound, e.g. hydrogen sulfide, may be present in the gaseous fuel so that the subsequent combustion generates combustion reaction products containing additional sulfur dioxide beyond that produced by the endothermic dissociation of the sulfuric acid.

FIG. 1 illustrates the use of both liquid fuel and gaseous fuel in carrying out the method of the invention. Generally only one of liquid fuel or gaseous fuel would be employed although, as illustrated in FIG. 1, both gaseous fuel and liquid fuel may be employed simultaneously in the practice of this invention.

Referring back to FIG. 1, liquid fuel 4 is provided into combustion zone 2 through conduit or injector 5. Preferably liquid fuel is provided into combustion zone 2 at a point above that where oxidant 1 is provided into combustion zone 2 so as to take advantage of gravity effects for the subsequent mixing and combustion of the fuel and oxidant. If provided above the oxidant, the liquid fuel may be provided directly above the oxidant or to the side. As mentioned, FIG. 1 also illustrates the use of gaseous fuel which may be used together with liquid fuel or separately without the use of liquid fuel. As illustrated in FIG. 1, gaseous fuel 6 is provided into combustion zone 2 through conduit or injector 7. Preferably the gaseous fuel is provided into combustion zone 2 at a point below that where oxidant 1 is provided into combustion zone 2 so as to take advantage of buoyancy effects for the subsequent mixing and combustion of the fuel and oxidant. If provided below the oxidant, the gaseous fuel may be provided directly below the oxidant or to the side. As is appreciated by one skilled in the art, the oxidant and fuel may each be provided into the combustion zone through a single injection point or through a plurality of injection points.

Within the combustion zone the fuel and oxidant are combusted in a combustion reaction to produce heat and to form combustion reaction products. The combustion reaction products will include carbon dioxide and water vapor and may include other products depending on the composition of the fuel. As mentioned, when the fuel contains sulfur or an oxidizable sulfur-containing compound, the combustion reaction products may include sulfur dioxide.

Contaminated acid 8 is provided into combustion zone 2, such as through manifolded injection conduits 9, generally in liquid form and most preferably in the form of liquid droplets 10. The contaminated acid will generally contain from 20 to 90 weight percent acid, e.g. sulfuric acid, and from 10 to 80 weight percent contaminants which may include one or more hydrocarbons, water, and salts such as ammonium sulfate and ammonium bisulfate. Heat from the combustion zone generated by the combustion of fuel and oxidant is provided to the acid to vaporize the acid and to endothermically dissociate the acid to produce one or more oxygen-containing dissociation products. Sulfuric acid is thus endothermically dissociated into, inter alia, water vapor and sulfur dioxide. When a sulfur containing salt is present, such compound may also endothermically dissociate into one or more oxygen-containing dissociation products. When the contaminated acid comprises one or more combustible contaminants, such combustibles may also combust with the oxidant to provide further combustion reaction products.

The contaminated acid may be provided into the combustion zone at any effective location. FIG. 1 illustrates a preferred arrangement wherein the contaminated acid is provided into the combustion zone in a direction substantially perpendicular to the flow direction of the oxidant. If the contaminated acid is provided into the combustion zone perpendicular to the oxidant, it may be provided in the same vertical plane as that of the oxidant flow or it may be offset in either direction by, or example, up to 45 degrees or more. The acid may also be provided into the combustion zone through the same end wall as that through which the oxidant is injected and in a flow direction substantially the same as that of the oxidant.

As mentioned previously, the oxidant is provided into the combustion zone with a velocity sufficient to cause a recirculation flow to occur within the combustion zone. This recirculation flow causes combustion reaction products from within the combustion zone to recirculate, such as is shown by arrows 11 in FIG. 1, into the combustion reaction of the fuel and oxidant. This causes a dilution of the combustion reaction and enables it to proceed at a lower peak flame termperature than would otherwise be the case with oxygen or oxygen-enriched air as the oxidant. The lower peak flame temperature, in turn, inhibits the formation of $NO_x$ which would create an environmental pollution problem and, in the case of sulfuric acid processing, create a downstream product purity problem. The internal recirculation, i.e. recirculation within the combustion zone, additionally provides enhanced mixing of the fuel and oxidant. This enhanced mixing, in turn, reduces or eliminates hot spots within the combustion zone resulting in improved equipment life, and provides a mechanism for carrying out combustion in a manner which minimizes incomplete combustion, thus generating more heat from the fuel on a unit basis to be used in the endothermic vaporization and dissociation of the acid. Still further, the internal recirculation more effectively applies heat generated by the combustion reaction to the acid by causing a more even heat distribution within the combustion zone, i.e. the elimination of hot and cold spots, and the more intimate mixing of the acid with the heat bearing recirculating combustion reaction products. In short, heat is more effectively provided to the acid causing improved production of oxygen-containing dissociation product, e.g. sulfur dioxide, and to the extent that sulfur is available in the fuel, more sulfur dioxide is produced by the combustion of the fuel owing to the more complete combustion. This is accomplished without generating high levels of $NO_x$ and while avoiding hot spots within the combustion zone. Thus the throughput of the acid treatment processing is increased by the effective elimination of some inert nitrogen which would have been present in air and, since sulfur dioxide production is enhanced, less or no additional sulfur need be combusted to achieve the requisite sulfur dioxide concentration for the downstream converter, thus improving the economics of the contaminated acid treatment process.

The spacing between the points where the fuel and oxidant are provided into the combustion enables the recirculation flow within the combustion zone to have a beneficial effect prior to the mixture of the fuel with the oxidant and their combustion. Preferably the fuel and oxidant are provided into the combustion zone with a spacing between them of at least 3 inches and, depending on the size of the furnace or combustion zone, of at least 24 inches or more. When the furnace is cylindrical so that the end wall is circular having a radius, it is most preferred that the fuel and oxidant injection points be spaced by a distance equal to at least one third of this radius.

Another particular benefit of the method of this invention employing high oxidant velocity and internal recirculation is that the combustion reaction and the endothermic dissociation of the acid may occur substantially within the first or front half of the length of the combustion zone. As shown in FIG. 1, the combustion reaction of fuel and oxidant and the endothermic dissociation of the acid occurs in about the first third of the length L of the internal volume of the combustion zone. This provides additional space or volume within the combustion zone and also provides additional gas residence time for the complete destruction of hydrocarbons and the reaction of sulfur-containing material to minimize or eliminate the products of incomplete combustion (PIC's).

A stream 12 containing combustion reaction products, uncombusted species and oxygen-containing dissociation product is passed out of combustion zone 2 for further processing. FIG. 2 illustrates in simplified schematic form one embodiment of such further processing. Referring now to FIG. 2, wherein the numerals correspond to those of FIG. 1 for common elements, stream 12 is passed through gas cleaning unit 13 to produce clean oxygen-containing dissociation product 14, e.g. sulfur dioxide. Stream 14 is then reacted with oxygen provided from any effective source 15 in converter 16 to produce sulfur trioxide in the case of sulfuric acid treatment. The resulting species 17 is then passed through an absorption tower 18 wherein it reacts with water 19 to form fresh acid 20 such as sulfuric acid. Prior to passage into gas cleaning unit 13, stream 12 may be passed through a waste heat boiler or other heat exchange means for the recovery of heat.

The following examples and comparative example are presented for illustrative purposes and are not intended to be limiting.

EXAMPLE 1

Employing an apparatus similar to that illustrated in FIG. 1, technically pure oxygen was injected at a point about at the center of the end wall into the combustion zone at a velocity of about 2,000 feet per second. Natural gas was injected into the combustion zone below the point of oxygen injection at a flow rate of 36,000 standard cubic feet per hour (SCFH), and waste oil was injected into the combustion zone above the point of oxygen injection at a flow rate of 80 pounds per minute which provided a heat input of 70 million BTU per hour. The gaseous fuel was provided into the combustion zone from two points each 40 inches below the oxidant injection point and each at an angle of 35 degrees to either side of the oxidant injection point so that the distance between the oxidant and gaseous fuel injection points was 49 inches along the diagonal. The liquid fuel was provided into the combustion zone from two points each 33 inches above the oxidant injection point and each at an angle of 55 degrees to either side of the oxidant injection point so that the distance between the oxidant and liquid fuel injection points was 58 inches along the diagonal. In addition, air was provided into the combustion zone through the gaseous fuel injection points to provide the remainder of the oxygen requirement. The overall oxygen concentration taking into account both the air and the technically pure oxygen was 26 percent. At these flow rates the fuel underwent substantially complete combustion within the combustion zone.

Contaminated liquid sulfuric acid, comprising about 88 weight percent sulfuric acid and further comprising about 5 weight percent water and about 7 weight percent hydrocarbons was introduced into the combustion zone substantially perpendicular to the flow of oxygen. Recirculation flow from within the combustion zone caused the turbulent mixture of the contaminated acid with hot combustion reaction products prior to their intermixture into the combustion reaction thus facilitating the vaporization and the dissociation of the sulfuric acid to produce sulfur dioxide. The treatment process of this invention was able to treat contaminated sulfuric acid at the rate of 890 tons per day (TPD) under the conditions described in this Example 1. NOx emissions from the process were measured at 30.94 pounds per hour. The combustion of fuel and oxidant and the dissociation of sulfuric acid was carried out substantially within the first third of the length of the combustion zone.

COMPARATIVE EXAMPLE

A procedure similar to that described in Example 1 was carried out except that only air was employed as the oxidant. The air was injected through the gaseous fuel injection points at a velocity below 50 fps. The natural gas flow rate was 36,000 SCFH but the waste oil injection rate was only 33 pounds per minute, providing a heat input of 29 million BTU per hour, in order to maintain substantially complete combustion. The contaminated sulfuric acid processing rate was at a maximum of only 690 TPD and the NOx emissions increased to 32.57 pounds per hour. This demonstrates that the invention not only provides a significant increase in the processing rate for treating contaminated sulfuric acid over that attainable with conventional air-based systems under comparable conditions, but also that the invention enables an increased throughout without an increase in NOx emissions as might be expected with oxygen or oxygen-enriched air combustion. Indeed NOx formation with the process of this invention decreased in absolute terms and was much lower in terms of acid processing rate over that possible with an air-fired system.

EXAMPLE 2

A procedure similar to that reported in Example 1 was carried out except that only high BTU waste oil, at a rate of 72 pounds per minute and having a heating value of more than 80 million BTU per hour, was used as the fuel. The contaminated sulfuric acid processing rate was 872 TPD and the NOx emissions generated were only 22.60 pounds per hour.

By use of the method of this invention, one can increase the contaminants and processing rate without increasing NO$_x$ formation. The invention accomplishes this, inter alia, by effectively matching heat sources and heat sinks within the combustion zone by the effective intermixture of heat bearing and heat adsorbing species in a manner which simultaneously improves both combustion efficiency and heat transfer efficiency within the combustion zone.

Although the invention has been described in detail with respect to certain embodiments, those skilled in the art will recognize that there are other embodiments of the invention within the spirit and the scope of the claims.

I claim:

1. A method for treating contaminated acid comprising:
   (a) providing fuel into a combustion zone and, spaced therefrom, providing oxidant into the combustion zone, said oxidant having an oxygen contratoin of at least 25 percent and a velocity sufficient to cause a recirculation flow within the combustion zone;
   (b) combusting fuel and oxidant within the combustion zone to produce heat and to form combustion reaction products;
   (c) providing acid to the combustion zone and applying heat from the combustion zone to the acid to endothermically dissociate the acid to produce an oxygen-containing dissociation product; and
   (d) recirculating combustion reaction products within the recirculation flow into the combustion reaction of the oxidant and fuel to dilute the combustion reaction and thus carry out the combustion reaction at a lower peak flame temperature, and to enhance the application of heat to the acid for the endothermic dissociation.

2. The method of claim 1 wherein the acid is sulfuric acid and the oxygen-containing dissociation product comprises sulfur dioxide.

3. The method of claim 1 wherein the oxidant has an oxygen concentration of at least 90 percent.

4. The method of claim 1 wherein the oxidant is technically pure oxygen.

5. The method of claim 1 wherein the oxidant has a velocity of at least 300 feet per second.

6. The method of claim 1 wherein the fuel is liquid.

7. The method of claim 6 wherein the liquid fuel is provided into the combustion zone above the area where oxidant is provided into the combustion zone.

8. The method of claim 6 wherein the liquid fuel contains sulfur and/or an oxidizable sulfur containing compound.

9. The method of claim 1 wherein the fuel is gaseous.

10. The method of claim 9 wherein the gaseous fuel is provided into the combustion zone below the area where oxidant is provided into the combustion zone.

11. The method of claim 9 wherein the gaseous fuel comprises an oxidizable sulfur containing compound.

12. The method of claim 1 wherein the fuel comprises both liquid fuel and gaseous fuel.

13. The method of claim 12 wherein the liquid fuel is provided into the combustion zone above, and the gaseous fuel is provided into the combustion zone below, the area where the oxidant is provided into the combustion zone.

14. The method of claim 1 wherein the contaminated acid comprises combustible material which combusts with oxidant within the combustion zone.

15. The method of claim 1 wherein the acid is provided into the combustion zone in liquid form and is vaporized prior to the endothermic dissociation.

16. The method of claim 1 wherein the acid is provided into the combustion zone substantially perpendicular to the flow of oxidant.

17. The method of claim 1 wherein the combustion of fuel and oxidant and the dissociation of acid occurs substantially within the first half of the length of the combustion zone.

18. The method of claim 2 further comprising passing a stream containing sulfur dioxide from the combustion zone through a cleaning unit to produce clean sulfur dioxide, oxidizing clean sulfur dioxide to produce sulfur trioxide, and reacting sulfur trioxide with water to produce sulfuric acid.

19. The method of claim 1 further comprising providing air to the combustion zone to provide additional oxygen for the combustion reaction.

* * * * *

UNITED STATES PATENT AND TRADEMARK OFFICE
CERTIFICATE OF CORRECTION

PATENT NO. : 5,022,332
DATED : June 11, 1991
INVENTOR(S) : M. G. Ding It is certified that error appears in the above-identified patent and that said Letters Patent is hereby corrected as shown below:

In column 2, line 59 delete "ration" and insert therefore -- oxygen concentration --

In column 2, line 60 delete "oxygen concentration".

Signed and Sealed this

Fifteenth Day of September, 1992

Attest:

DOUGLAS B. COMER

*Attesting Officer*          *Acting Commissioner of Patents and Trademarks*